United States Patent
Deardurff

(10) Patent No.: US 7,156,907 B2
(45) Date of Patent: Jan. 2, 2007

(54) MULTIMERIC DYE STRUCTURES

(75) Inventor: Larrie A Deardurff, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/691,812

(22) Filed: Oct. 22, 2003

(65) Prior Publication Data

US 2005/0086750 A1 Apr. 28, 2005

(51) Int. Cl.
*C09D 11/00* (2006.01)
*C09B 69/00* (2006.01)

(52) U.S. Cl. ............... 106/31.27; 106/31.58; 106/31.43; 8/680; 8/685; 8/696

(58) Field of Classification Search ............. 106/31.27, 106/31.58, 31.43; 8/680, 685, 696
See application file for complete search history.

(56) References Cited

U.S. PATENT DOCUMENTS

| | | | |
|---|---|---|---|
| 3,451,820 A | 6/1969 | Umberger | |
| 4,071,684 A | 1/1978 | Schuster, Jr. et al. | |
| 4,804,411 A * | 2/1989 | Eida et al. | 106/31.48 |
| 5,304,528 A | 4/1994 | Kanto et al. | |
| 5,413,630 A | 5/1995 | Schwarz et al. | |
| 5,684,139 A * | 11/1997 | Wild et al. | 534/797 |
| 5,733,363 A * | 3/1998 | Nagashima et al. | 106/31.43 |
| 5,854,323 A | 12/1998 | Itabashi et al. | |
| 6,059,870 A * | 5/2000 | Taylor et al. | 106/31.43 |
| 6,090,159 A * | 7/2000 | Maubru | 8/401 |
| 6,140,494 A | 10/2000 | Hamilton et al. | |
| 6,372,907 B1 * | 4/2002 | Lee et al. | 546/41 |
| 6,743,588 B1 * | 6/2004 | Tokunaga et al. | 435/6 |
| 6,783,223 B1 * | 8/2004 | Okada et al. | 347/100 |
| 2003/0209166 A1 * | 11/2003 | Vanmaele et al. | 106/31.27 |
| 2004/0206270 A1 * | 10/2004 | Vanmaele et al. | 106/31.27 |
| 2005/0241074 A1 * | 11/2005 | Greaves et al. | 8/405 |

* cited by examiner

*Primary Examiner*—J. A. Lorengo
*Assistant Examiner*—Veronica Faison-Gee

(57) ABSTRACT

The present invention is drawn to multimeric dyes, ink-jet inks, and systems that can be used to print images having good water fastness and humid fastness, as well as good color characteristics. Specifically, a multimeric dye for ink-jet printing can comprise a first dye molecule chemically coupled to a second dye molecule through a linker group, wherein the multimeric dye is stable in the presence of interfering metals. These multimeric dyes can be used to form ink-jet inks and can be used in printing systems in accordance with embodiments of the present invention.

58 Claims, No Drawings

MULTIMERIC DYE STRUCTURES

FIELD OF THE INVENTION

The present invention is drawn to dye-based ink-jet imaging. More specifically, the present invention is drawn to substantially stable multimeric dye structures coupled together by a linker group.

BACKGROUND OF THE INVENTION

As the ink-jet printing field develops, improvements in printing characteristics such as edge acuity, optical density, substrate adherence, dry time, resolution, durability, and waterfastness continue to be explored. At the same time, while trying to improve upon these characteristics, fluids of the ink-jet system should also provide long term storage compositional stability and long term reliability without equipment corrosion or nozzle clogging. Though the above lists of characteristics provide a worthy goal, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed objectives.

Various substances have been used to formulate ink-jet inks and other recording solutions in an attempt to meet the above objectives. Some of these substances which have been included are pigments and/or dyes to provide color to the image, water and/or water-soluble organic solvents to provide a liquid composition that functions properly within ink-jet equipment, surfactants of various ionic character to provide decreased surface tension at various liquid interfaces, dispersants for enhancing solubility characteristics, and various other solution characteristic modifiers such as viscosity modifiers, pH adjustors, antiseptics, antioxidants, chelating agents, biocides, and the like.

Printing media has also been modified to utilize a variety of substances, including various binding materials to improve recording parameters. These binding materials can include inorganic porous coatings, such as silica and alumina, or swellable organic coatings, such as gelatins and other similar compositions. These materials can be coated on a paper or other substrate to provide improvement in image quality when an ink-jet ink is printed thereon, as is generally known in the art.

In general, ink-jet inks are either dye- or pigment-based inks. Both are typically prepared in an ink vehicle that contains the dye and/or the pigment. Dye-based ink-jet inks generally use a liquid dye that is usually water-based to turn the media a specific color. Conversely, pigmented inks typically use a solid or dispersed dye to achieve color.

Color characteristics, water fastness, and humid fastness of dye-containing inks play an important role in the quality of the printed ink-jet image. Perceived color quality can be characterized using any one of several color space systems, such as CIELAB or Munsell, as is well known in the art. Though dye-based ink-jet inks can provide good color characteristics, water fastness and humid fastness of printed images, particularly on porous media, can remain a challenge, as exposure to water or humidity after printing can cause color shift and/or dye migration, for example.

As a result of the state of the art, it would be desirable to provide dye structures and ink-jet inks containing those dye structures that provide good color characteristics, and also provide good water fastness and humid fastness.

SUMMARY OF THE INVENTION

It has been recognized that certain multimeric dye structures can provide good water fastness and humid fastness, and can perform well on specialty media, such as porous media. In accordance with this recognition, a multimeric dye for ink-jet printing in accordance with embodiments of the present invention can comprise a first dye molecule chemically coupled to a second dye molecule through a linker group, wherein the multimeric dye as a whole is substantially stable in the presence of interfering metals.

In an alternative embodiment, an ink-jet ink can comprise a liquid vehicle and from 1 wt % to 10 wt % of multimeric dye solvated in the liquid vehicle. The multimeric dye can include a first dye molecule chemically coupled to a second dye molecule through a linker group, wherein the multimeric dye as a whole is substantially stable in the presence of interfering metals.

In another embodiment, a system for printing water fast and humid fast images can comprise an alumina- or silica-containing porous media substrate, an ink-jet ink, and an ink-jet pen configured for jetting the ink-jet ink onto the alumina- or silica-containing porous media substrate. In this embodiment, the ink-jet ink can include multimeric dye having a first dye molecule chemically coupled to a second dye molecule through a linker group, wherein the multimeric dye as a whole is substantially stable in the presence of interfering metals.

Additional features and advantages of the invention will be apparent from the detailed description that follows, which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

Concentrations, amounts, molecular sizes, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 wt % to about 5 wt %" should be interpreted to include not only the explicitly recited concentration of about 0.1 wt % to about 5 wt %, but also include individual concentrations and the sub-ranges within the indicated range. Thus, included in this numerical range are individual concentrations such as 1 wt %, 2 wt %, 3 wt %, and 4 wt %, and sub-ranges such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than about 5 wt %" should be interpreted to include all values and sub-ranges between 0 wt % and 5 wt %. Furthermore, such an interpretation should apply regardless of the breadth of the range or the characteristics being described.

As used herein, "effective amount" refers to at least the minimal amount of a substance or agent, which is sufficient to achieve a desired effect. For example, an effective amount of an "ink vehicle" is at least the minimum amount required in order to create an ink composition, while maintaining properties desired for effective ink-jetting.

As used herein, "liquid vehicle" or "ink vehicle" refers to the liquid fluid in which a multimeric dye is placed to form an ink. Ink vehicles are well known in the art, and a wide variety of ink vehicles may be used with the systems and methods of the present invention. Such ink vehicles may include a mixture of a variety of different agents, including, surfactants, solvents, co-solvents, buffers, biocides, sequestering agents, viscosity modifiers, water, etc.

The term "multimeric dye" refers to multimeric dyes that include two or more dyes covalently attached to a common linker group.

The term "linker group" refers to the organic group that is attached to two or more dyes to form the multimeric dye. The linker group, in accordance with principles of the present invention, can be substantially non-reactive with compositions present on porous media, such as silica, alumina, or residual metals. If the linker group is reactive to some degree, it can be configured in the multimeric dye structure such that the multimeric dye as a whole is substantially stable in the presence of interfering metals.

"Linker group precursor" refers to the linker group prior to attachment to the dyes to form a multimeric dye. The linker group precursor typically includes reactive groups that can be reacted with dyes to form amide, ester, or ether bonds.

The term "alumina- or silica-containing," when referring to porous media substrates, indicates that alumina or silica are included in a coating of the porous media substrate. Residual metals, such as iron, cobalt, nickel, copper, chromium, and aluminum, are also often present in these coatings, which can often undesirably react with dyes or liquid vehicle components.

The term "substantially stable," when referring to multimeric dye in the presence of interfering metals, means that a multimeric dye prepared in accordance with principles of the present invention will not substantially complex with interfering metals. Often, complexing groups such as ethers and amines, and/or complexing atoms such as phosphorus, oxygen, and sulfur, when placed in close proximity to one another in a molecular structure, can work together to complex metals. If trace or residual metals are present in porous media coatings, as is often the case, such configurations within a dye structure can act to complex with the trace metals, causing color characteristics or other properties of the dye to become undesirably altered. Substantially stable multimeric dyes in accordance with principles of the present invention can include from none to very few of these complexing groups and/or complexing atoms, or alternatively, if more than three of these complexing groups or complexing atoms are present, they are positioned at a great enough distance with respect to one another such that complexation between the multimeric dye and the residual metal is disfavored. In this configuration, the multimeric dye is said to be substantially stable, as it will not substantially react with these residual metals, even in their immediate presence.

The term "interfering metals" includes aluminum as well as transition metals such as iron, cobalt, nickel, copper, and chromium. These metals are often present in trace or residual amounts in alumina- or silica-containing porous media coatings. They are said to be interfering as, if they react with the multimeric dyes of the present invention, they will alter color characteristics or other properties of the multimeric dye. Interfering metals do not include chromaphoric metals that are deliberately present in dye structures for contributing to color characteristics, such as in metal-complex dyes and the like.

It has been recognized that by linking two or more dyes together to form a larger dye structure has the benefit of providing dyes having improved humid fastness and water fastness when printed in a liquid vehicle on porous media, such as porous glossy photo media sold by Hewlett-Packard Company. These dyes can also be made to be soluble in water, and thus, can still be used in aqueous based ink-jet ink formulations that are reliable. Additionally, by using two or more different dyes (same or different chemical classes) as part of a single large molecular structure, interesting and useful interactions can be present, such as those that improve stability toward light and air.

As these multimeric dyes are designed particularly for use with porous media, selection of a linking group can be carried out to avoid unwanted multimeric dye and media interactions. For example, the linking group can be chosen such that it does not substantially contribute to reaction with metals that are typically present with silica or alumina media coatings.

Another problem associated with many ink-jet inks when printed on photo media relates to humid fastness. Poor humid fastness causes dye migration or color changes to occur when a printed image is stored or exposed to higher humidity levels, and even sometimes in ambient humidity conditions. This issue results in a reduction in long term image permanence. By preparing larger dye structures, such as in accordance with embodiments of the present invention, migration and diffusion of the dye tends to slow, as the interaction between the dye and the media tends to increase, due in part to the large size of the multimeric dye.

With this in mind, a multimeric dye for ink-jet printing can comprise a first dye molecule chemically coupled to a second dye molecule through a linker group, wherein the multimeric dye as a whole can be substantially stable in the presence of interfering metals, such as those interfering metals commonly present in porous media coatings.

In an alternative embodiment, an ink-jet ink can comprise a liquid vehicle and from 1 wt % to 10 wt % of multimeric dye solvated in the liquid vehicle, wherein the multimeric dye includes a first dye molecule chemically coupled to a second dye molecule through a linker group. Again, the multimeric dye as a whole can be substantially stable in the presence of interfering metals, such as those interfering metals commonly present in porous media coatings.

In another embodiment, a system for printing water fast and humid fast images can comprise an alumina- or silica-containing porous media substrate, an ink-jet ink, and an ink-jet pen configured for jetting the ink-jet ink onto the alumina- or silica-containing porous media substrate. The ink-jet ink can include a first dye molecule chemically coupled to a second dye molecule through a linker group, wherein the multimeric dye as a whole is substantially stable in the presence of interfering metals present in the alumina- or silica-containing porous media substrate.

With respect to the above described multimeric dye, ink-jet ink, and system, various more detailed features can be practiced in accordance with embodiments of the present invention. In one embodiment, the first dye molecule and the second dye molecule can have the same chemical structure, thus, altering the bulk of the multimeric dye. In an alternative embodiment, the first dye molecule and the second dye molecule can have different chemical structures. The different chemical structures can generally be of a similar color, e.g., two different cyan, magenta, yellow, or black dyes, or can be of two or more different colors, e.g., a cyan dye and a magenta dye. In other words, in this latter embodiment, the first dye molecule can be of a first color and the second dye molecule can be of a second color, thereby resulting in a multimeric dye structure that imparts a third color that is more than marginally different than the first color and the second color. In either embodiment, a multimeric dye of larger bulk is also realized.

In more detail, the linker group can be coupled to the first dye molecule and/or the second dye molecule by a bonding structure selected from the group consisting of an amide bond, an ether bond, and an ester bond. Further, the linker group can include an alkylene group, an arylene group, or a cycloalkylene group providing bulk or distance between the amide bond(s), ether bond(s), or ester bond(s). Example linker group precursors that can be used to form the linker groups include triazines, alkylene diacids and diamines, arylene diacids and diamines, cycloalkylene diacids and diamines, and the like. In one embodiment, diacids of linker group precursors can form linker groups attached to dyes by ester or ether bonds. In another embodiment, diamines of linker group precursors can form linker groups attached to dyes with amide bonds.

Cycloalkylenes exemplify an interesting type of linker group in that they can provide a great deal of flexibility as to how two or more dyes can be attached thereto, providing subtle or less than subtle differences in color characteristics depending on where the individual dyes are attached to the cycloalkylene linker group. For example, a first dye molecule can be configured cis on a cycloalkylene linker group with respect to the second dye molecule. Alternatively, a first dye molecule can be configured trans on a cycloalkylene linker group with respect to the second dye molecule. Additionally, two dyes can be configured on a cycloalkylene linker group in a 1,2 configuration, a 1,3 configuration, or a 1,4 configuration with respect to one another.

The following structures, shown as Formula 1 (A–D), illustrate various possible dimeric dye structures that can be prepared in accordance with embodiments of the present invention.

Formula 1

A)

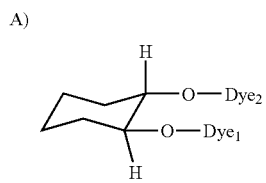

B)

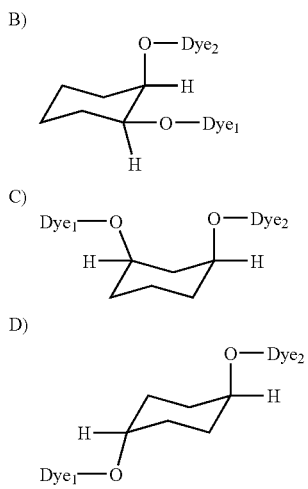

C)

D)

In Formula 1 above, $Dye_1$ and $Dye_2$ can be any dye structure that can be reacted with a linker group precursor to form ether bonds, as shown. The various cycloalkylene linker groups that are shown are the same in that they all include saturated 6-carbon ring structures and two ether groups for attaching two dye structures thereto. However, the configuration of dye attachment is different in each of structures A–D, illustrating the flexibility of dimeric dye attachment that can be prepared in accordance with embodiments of the present invention. For example, structure A provides the dyes in a 1,2 cis configuration, structure B provides the dyes in a 1,2 trans configuration, structure C depicts a 1,3 dye configuration, and structure D depicts a 1,4 dye configuration. Other cycloalkylene groups can be used other than those shown in Formula 1, as would be known to those skilled in the art after considering the present disclosure. Additionally, though ether bonds are shown in Formula 1, these bonding structures are shown for exemplary purposes only. One skilled in the art would recognize that other bonding types, such as amide bonds and ester bonds can also be used.

Other exemplary structures are provided in Formula 2 below that are also in accordance with embodiments of the present invention.

Formula 2

A)

B)

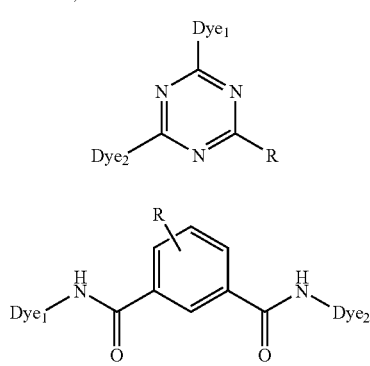

-continued

C)

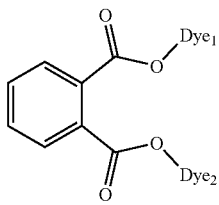

D)

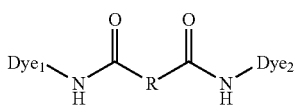

In Formula 2 above, Dye$_1$ and Dye$_2$ can be any dye structure that can be reacted with a linker group precursor to form an attachment bond, such as an amide bond with respect to structures B and D, or an ester bond with respect to structure C. Structure A does not show the bonding type, but can be by any functional bonding structure, as is known in the art. R can be lower alkyl or substituted alkyl having from 2 to 8 carbon atoms, or aryl or substituted aryl. Additionally, carbon atoms of the alkyl or aryl groups can be replaced with one or more hetero-atoms, as long as the replaced carbon atom is not positioned in such a manner to substantially interact with metals, e.g., triazine, tertiary amine, etc.). As stated, the compositions shown in Formulas 1 and 2 are exemplary only. Many numerous modifications are possible. For example, structure B of Formula 2 can include ester bonds rather than amide bonds, depending in part on the type of dye that is desired to be attached to the linker group.

In order to form the structures shown in the above examples and other similar embodiments, a linker group precursor can be provided that interacts with a dye to form covalent linkages, as described. Thus, when considering what dyes to use with a respective linking group, chemical properties of both the dyes and the linking group precursor should be considered. Specifically, the dye or linker group precursor used need not be limited to any particular class, as long as the dye has a group that can react with the linking group to form a covalent bond. Typically, functionalities that can be present on the dyes and/or linker group precursor can be —OH, —NH$_2$, or —COOR', where R' is H, lower alkyl, aryl, or the like.

Many different types of dyes can be used in accordance with the present invention. In certain embodiment, the first dye and/or the second dye molecule be H-acid dye, gamma-acid dye, xanthene dye, metal-complex dye, phthalocyanine dye, or azo or diazo dye. Other known dyes can also be used as are generally known by those skilled in the art. By linking multiple dyes together through a common linker group, the size of the dye can be increased by more than two-fold, thereby providing dyes that tend to migrate less on porous media substrates. In one embodiment, the size of such a multimeric dye structure can be from 10 Angstroms to 20 Angstroms, or more. In one embodiment, the multimeric dye structure can be from 10 Angstroms to 60 Angstroms. In another embodiment, the multimeric dye structure can be from 20 Angstroms to 60 Angstroms. Additionally, though the dyes are larger in size, they can still be formulated to remain soluble in typical liquid vehicle formulations.

A typical ink vehicle formulation that can be used with a dye set of the present invention can include one or more organic solvents or co-solvents, present in total at from 5.0% to 50.0% by weight, and one or more non-ionic, cationic, and/or anionic surfactants, present from 0.01% to 10.0% by weight. The balance of the formulation can be purified water, or other vehicle components known in the art such as biocides, viscosity modifiers, materials for pH adjustment, sequestering agents, preservatives, and the like.

Classes of organic solvents or co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R. T. Vanderbilt Co.), Proxel (ICI America), and combinations thereof.

Sequestering agents such as EDTA (ethylene diamine tetra acetic acid) may be included to eliminate the deleterious effects of heavy metal impurities, and buffer solutions may be used to control the pH of the ink. From 0.001% to 2.0% by weight, for example, can be used. Viscosity modifiers and buffers may also be present, as well as other additives known to those skilled in the art to modify properties of the ink as desired. Such additives can be present at from 0.01% to 20% by weight.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Two NH-dyes are coupled to a triazine linker group precursor according to the following reaction scheme.

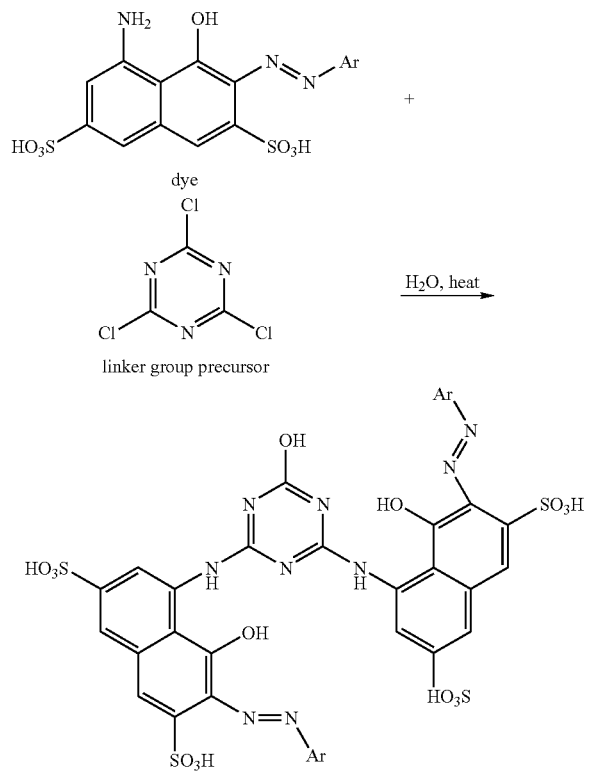

In the above reaction scheme, Ar can be an aryl or substituted aryl group. The dye can be reacted with the linker group precursor at a 2:1 molar ratio. Two chlorines of the linker group are replaced by two dye molecules at their respective NH$_2$ groups, and the HCl is formed as a byproduct. The third chlorine of the linker group can then be reacted with excess water in the presence of heat, e.g., about 80° C., causing replacement of the third chlorine with a hydroxyl group, wherein additional HCl is formed. This reaction can be conducted in the presence of a polar organic solvent that does not, of itself, attack the chlorine on the linker group. An exemplary solvent that can be used includes tetrahydrofuran.

Example 2

Two NH-dyes are coupled to a diacid linker group precursor according to the following reaction scheme.

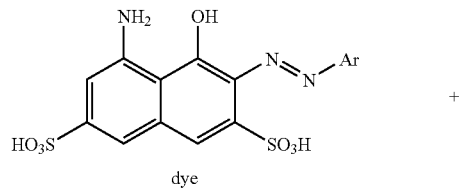

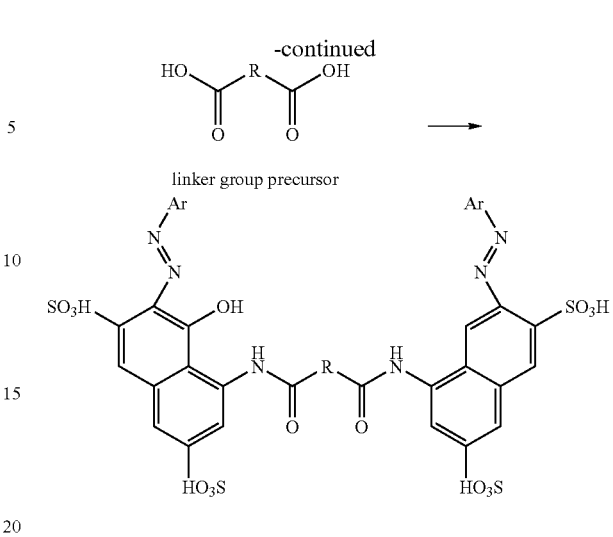

In the above reaction scheme, Ar can be an aryl or substituted aryl group. The dye can be reacted with a cyanuric chloride linker group precursor at a 2:1 molar ratio according to one of a several reaction schemes. In a first embodiment, the dye can be reacted with triphenylphosphine triflate [Ph$_3$P(OTf)$_2$], and then reacted with the linker group precursor. In a second embodiment, triphenylphosphine and tetrachloromethane can be reacted with the dye to prepare the dye for reaction with the linker group precursor. In a third embodiment, dicyclohexylcarbodimide and ethyl ether can be used to prepare the dye for reaction with the linker group. In a fourth embodiment, the acid groups of the linker group can be converted to an ester, such as by tosylating the linker group precursor and reacting it with the dye. Other means of linking the dyes to linker group precursors can also be employed, as would be known to those skilled in the art after considering the present description.

While the present invention has been described with reference to certain preferred embodiments, those skilled in the art will appreciate that various modifications, changes, omissions, and substitutions can be made without departing from the spirit of the invention. It is to be understood that the present invention is not limited to the disclosed embodiments. The invention is intended to cover various modifications and equivalent arrangements included within the spirit and scope of the claims. Therefore, it is intended that the invention be limited only by the scope of the following claims, where the claims are to be given the broadest interpretation so as to encompass all such modifications and equivalent arrangements.

The invention claimed is:

1. A multimeric dye for ink-jet printing, comprising a first dye molecule chemically coupled to a second dye molecule through a linker group, said multimeric dye as a whole being substantially stable in the presence of interfering metals, said interfering metals including at least one member selected from the group consisting of aluminum, and one or more transition metal;

and wherein the linker group is coupled to the first dye molecule or the second dye molecule by a bonding structure selected from the group consisting of a triazine, an amide bond, an ether bond, and an ester bond, and wherein the linker group further includes an alkylene group, an arylene group, or a cycloalkylene group.

2. A multimeric dye as in claim 1, wherein the first dye molecule and the second dye molecule have the same chemical structure.

3. A multimeric dye as in claim 1, wherein the first dye molecule and the second dye molecule have different chemical structures.

4. A multimeric dye as in claim 1, wherein the first dye molecule is an H-acid dye.

5. A multimeric dye as in claim 1, wherein the first dye molecule is a gamma-acid dye.

6. A multimeric dye as in claim 1, wherein the first dye molecule is a xanthene dye.

7. A multimeric dye as in claim 1, wherein the first dye molecule is a metal-complex dye.

8. A multimeric dye as in claim 1, wherein the first dye molecule is a phthalocyanine dye.

9. A multimeric dye as in claim 1, wherein the first dye molecule is an azo or diazo dye.

10. A multimeric dye as in claim 1, wherein the first dye molecule provides a first color, and the second dye molecule provides a second color, thereby resulting in a third color that is different than the first color and the second color.

11. A multimeric dye as in claim 1, wherein the linker group is a triazine.

12. A multimeric dye as in claim 1, wherein the linker group is attached to the first dye molecule and the second dye molecule by amide bonds.

13. A multimeric dye as in claim 1, wherein the linker group is attached to the first dye molecule and the second dye molecule by ether bonds.

14. A multimeric dye as in claim 1, wherein the linker group is attached to the first dye molecule and the second dye molecule by ester bonds.

15. A multimeric dye as in claim 1, wherein the linker group includes an alkylene group.

16. A multimeric dye as in claim 1, wherein the linker group includes an arylene group.

17. A multimeric dye as in claim 1, wherein the linker group includes a six-carbon cycloalkylene group, and wherein the first dye molecule is configured cis on the cycloalkylene with respect to the second dye molecule.

18. A multimeric dye as in claim 1, wherein the linker group includes a six-carbon cycloalkylene group, and wherein the first dye molecule is configured trans with respect to the second dye molecule.

19. A multimeric dye as in claim 1, wherein the linker group includes a six-carbon cycloalkylene, and the first dye molecule and the second dye molecule are in a 1,2 configuration on the cycloalkylene.

20. A multimeric dye as in claim 1, wherein the linker group includes a six-carbon cycloalkylene, and the first dye molecule and the second dye molecule are in a 1,3 configuration on the cycloalkylene.

21. A multimeric dye as in claim 1, wherein the linker group includes a six-carbon cycloalkylene, and the first dye molecule and the second dye molecule are in a 1,4 configuration on the cycloalkylene.

22. A multimeric dye as in claim 1, said multimeric dye being from 10 to 60 Angstroms in size.

23. A multimeric dye as in claim 1, wherein the multimeric dye is soluble in a liquid vehicle configured for jetting the multimeric dye.

24. An ink-jet ink, comprising:
(a) a liquid vehicle; and
(b) from 1 wt % to 10 wt % of multimeric dye solvated in the liquid vehicle, said multimeric dye including a first dye molecule chemically coupled to a second dye molecule through a linker group, said multimeric dye as a whole being substantially stable in the presence of interfering metals, said interfering metals including at least one member selected from the group consisting of aluminum, and one or more transition metal;
and wherein the linker group is coupled to the first dye molecule or the second dye molecule by a bonding structure selected from the group consisting of a triazine, an amide bond, an ether bond, and an ester bond, and wherein the linker group further includes an alkylene group, an arylene group, or a cycloalkylene group.

25. An ink-jet ink as in claim 24, wherein the first dye molecule and the second dye molecule have the same chemical structure.

26. An ink-jet ink as in claim 24, wherein the first dye molecule and the second dye molecule have different chemical structures.

27. An ink-jet ink as in claim 24, wherein the first dye molecule is a member selected from the group consisting of H-acid dye, gamma-acid dye, xanthene dye, metal-complex dye, phthalocyanine dye, and azo or diazo dye.

28. An ink-jet ink as in claim 24, wherein the first dye molecule provides a first color, and the second dye molecule provides a second color, thereby resulting in a third color that is different than the first color and the second color.

29. An ink-jet ink as in claim 24, wherein the linker group is a triazine.

30. An ink-jet ink as in claim 24, wherein the linker group is attached to the first dye molecule and the second dye molecule by amide bonds.

31. An ink-jet ink as in claim 24, wherein the linker group is attached to the first dye molecule and the second dye molecule by ether bonds.

32. An ink-jet ink as in claim 24, wherein the linker group is attached to the first dye molecule and the second dye molecule by ester bonds.

33. An ink-jet ink as in claim 24, wherein the linker group includes a member selected from the group consisting of an alkylene group, an arylene group, and a cycloalkylene group.

34. A system for printing water fast and humid fast images, comprising:
(a) an alumina- or silica-containing porous media substrate;
(b) an ink-jet ink including a first dye molecule chemically coupled to a second dye molecule through a linker group, said multimeric dye as a whole being substantially stable in the presence of interfering metals present in the alumina- or silica containing porous media substrate; and
(c) an ink-jet pen configured for jetting the ink-jet ink onto the alumina- or silica-containing porous media substrate;
wherein the linker group is coupled to the first dye molecule or the second dye molecule by a bonding structure selected from the group consisting of a triazine, an amide bond, an ether bond, and an ester bond, and wherein the linker group further includes an alkylene group, an arylene group, or a cycloalkylene group.

35. A system as in claim 34, wherein the first dye molecule and the second dye molecule have the same chemical structure.

36. A system as in claim 34, wherein the first dye molecule and the second dye molecule have different chemical structures.

37. A system as in claim 34, wherein the first dye molecule is a member selected from the group consisting of H-acid dye, gamma-acid dye, xanthene dye, metal-complex dye, phthalocyanine dye, and azo or diazo dye.

38. A system as in claim 34, wherein the first dye molecule provides a first color, and the second dye molecule provides a second color, thereby resulting in a third color that is different than the first color and the second color.

39. A system as in claim 34, wherein the linker group is a triazine.

40. A system as in claim 34, wherein the linker group is attached to the first dye molecule and the second dye molecule by amide bonds.

41. A system as in claim 34, wherein the linker group is attached to the first dye molecule and the second dye molecule by ether bonds.

42. A system as in claim 34, wherein the linker group is attached to the first dye molecule and the second dye molecule by ester bonds.

43. A system as in claim 34, wherein the linker group includes a member selected from the group consisting of an alkylene group, an arylene group, and a cycloalkylene group.

44. A multimeric dye for ink-jet printing, comprising a first dye molecule chemically coupled to a second dye molecule through a linker group, said multimeric dye as a whole being substantially stable in the presence of interfering metals, wherein the first dye molecule and the second dye molecule have different chemical structures;

wherein the linker group is coupled to the first dye molecule or the second dye molecule by a bonding structure selected from the group consisting of a triazine, an amide bond, an ether bond, and an ester bond, and wherein the linker group further includes an alkylene group, an arylene group, or a cycloalkylene group.

45. A multimeric dye as in claim 44, wherein the first dye molecule provides a first color, and the second dye molecule provides a second color, thereby resulting in a third color that is different than the first color and the second color.

46. A multimeric dye as in claim 44, wherein the first dye molecule is an azo dye, a triazo dye, an H-acid dye, a gamma-acid dye, a xanthene dye, a metal-complex dye, or a phthalocyanine dye.

47. A multimeric dye for ink-jet printing, comprising a first dye molecule chemically coupled to a second dye molecule through a linker group, said multimeric dye as a whole being substantially stable in the presence of interfering metals, wherein the first dye molecule is an H-acid dye, a gamma-acid dye, a xanthene dye, a metal-complex dye, or a phthalocyanine dye;

wherein the linker group is coupled to the first dye molecule or the second dye molecule by a bonding structure selected from the group consisting of a triazine, an amide bond, an ether bond, and an ester bond, and wherein the linker group further includes an alkylene group, an arylene group, or a cycloalkylene group.

48. A multimeric dye as in claim 47, wherein the first dye molecule and the second dye molecule have the same chemical structure.

49. A multimeric dye as in claim 47, wherein the first dye molecule and the second dye molecule have different chemical structure.

50. A multimeric dye as in claim 47, wherein the first dye molecule is the H-acid dye.

51. A multimeric dye as in claim 47, wherein the first dye molecule is a gamma-acid dye.

52. A multimeric dye as in claim 47, wherein the first dye molecule is a xanthene dye.

53. A multimeric dye as in claim 47, wherein the first dye molecule is a metal-complex dye.

54. A multimeric dye as in claim 47, wherein the first dye molecule is a phthalocyanine dye.

55. A multimeric dye for ink-jet printing, comprising a first dye molecule chemically coupled to a second dye molecule through a linker group, said multimeric dye as a whole being substantially stable in the presence of interfering metals, wherein the linker group is attached to the first dye molecule and the second dye molecule by amide bonds or by ether bonds.

56. A multimeric dye as in claim 55, wherein the linker group is attached by amide bonds.

57. A multimeric dye as in claim 55, wherein the linker group is attached by ether bonds.

58. A multimeric dye for ink-jet printing, comprising a first dye molecule chemically coupled to a second dye molecule through a linker group, said multimeric dye as a whole being substantially stable in the presence of interfering metals, said multimeric dye being from 10 to 60 Angstroms in size;

wherein the linker group is coupled to the first dye molecule or the second dye molecule by a bonding structure selected from the group consisting of a triazine, an amide bond, an ether bond, and an ester bond, and wherein the linker group further includes an alkylene group, an arylene group, or a cycloalkylene group.

* * * * *